May 17, 1932.   G. E. McLAUGHLIN   1,858,304
MEASURING MACHINE
Filed March 24, 1927
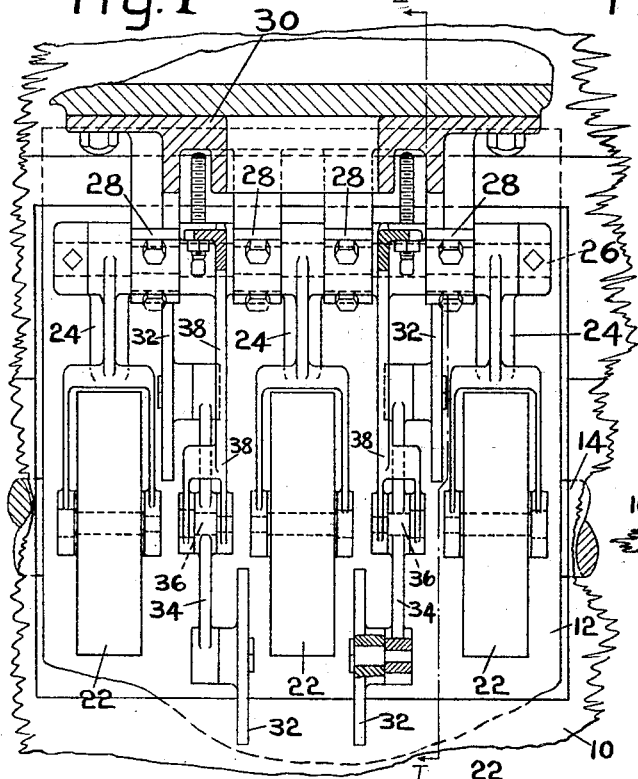
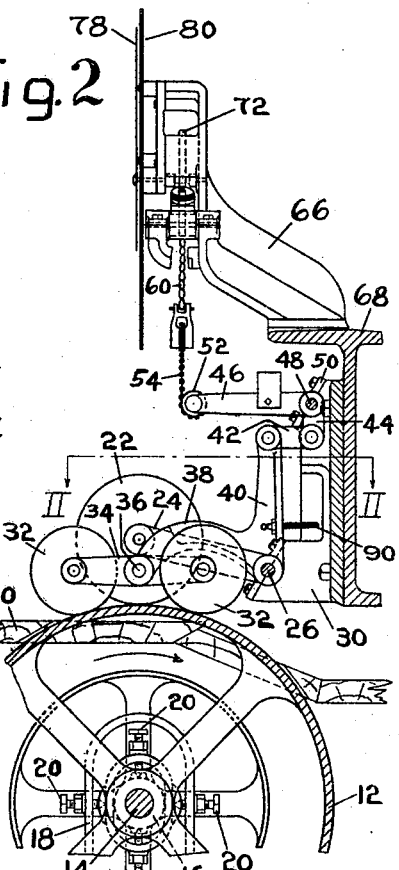
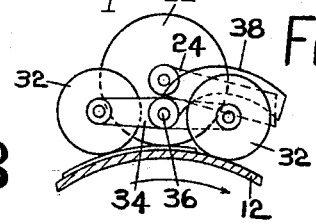
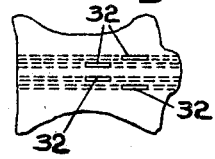
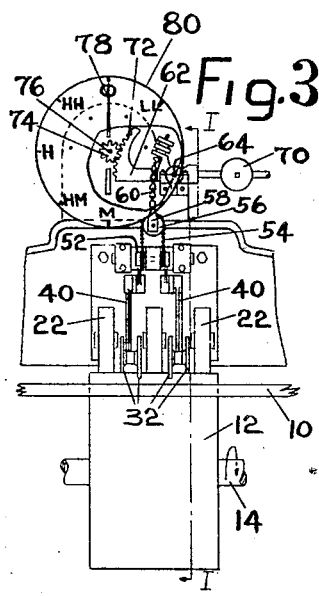
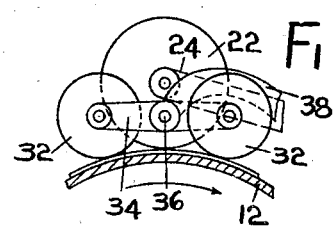
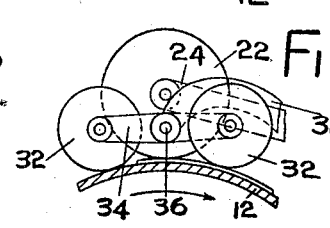
INVENTOR
George E. McLaughlin.

Patented May 17, 1932

1,858,304

UNITED STATES PATENT OFFICE

GEORGE E. McLAUGHLIN, OF PEABODY, MASSACHUSETTS, ASSIGNOR TO THE TURNER TANNING MACHINERY COMPANY, OF PORTLAND, MAINE, A CORPORATION OF MAINE

MEASURING MACHINE

Application filed March 24, 1927. Serial No. 178,024.

This invention relates to measuring machines and is illustrated as embodied in a machine designed for measuring thickness dimensions of hides, skins or pieces of leather, each of which varies substantially in thickness in various portions thereof, although various features of the invention are not limited to embodiment in machines for measuring such work.

In a well-known type of leather measuring machines in which the measuring members are wheels adapted for rolling contact with the surface of the work to be measured, measurement is made in a plurality of points in a single line extending across the piece of leather so that the average thickness is taken only along the said line at any given instant in the progress of the work through the machine. Furthermore, in the type of machine under discussion connections are provided between the measuring members and a pointer for moving the latter over a dial for the purpose of indicating the thickness of the work being measured, the arrangement being such that the pointer is vibrated more or less violently during the movement of the wheels over the work depending upon the differences encountered in the thickness dimensions in the various parts of the work, the greatest amount of vibration taking place at the instant of initiating the measuring operations, that is, when the wheels ride up over the entering edge of the work. This necessitates the provision of a dash pot or other damping means in connection with the pointer to damp the vibratory movements of the pointer to facilitate the work of the operator in determining the thickness measurements as indicated by the vibrating pointer.

It is an object of this invention to provide a machine of the type described which will be simple and durable in construction and effective to take still more accurate and representative measurements while pieces of work are passing in succession through the field of measuring operations.

To this end and in accordance with important features of the invention a plurality of measuring members is provided located along a plurality of lines extending from front to rear of the machine as well as from side to side thereof so as to take measurements of a piece of work, during feeding movement thereof, in a plurality of spots spaced with respect to each other both longitudinally and transversely of the work. In this way an unusually accurate average of thickness dimensions may be obtained at any given instant while work is being fed through the machine. Preferably, and as shown, the measuring or thickness detecting members are rotatably mounted and connected to each other in pairs so as to average initially the thickness measurements at a plurality of points upon lines extending longitudinally of the work. Since, in the construction shown, each pair of measuring members comprises a link connecting the members and since the link is pivotally connected at its center to an upwardly movable part of the measuring mechanism it follows that upward movement of each measuring member, as it rides up over the entering edge of the work, produces an effect on the measuring mechanism only one-half as great as would be the case if each measuring member were connected directly to the measuring mechanism without first averaging its movement through a centrally pivoted link, or other similiar means, as in the instant construction. For the reasons given the vibration of the pointer over the dial in the illustrated machine is reduced very considerably as compared with the amount of vibration produced in the pointer by the rotary measuring member of prior types of measuring machines when riding up over the entering edge of the work. Because of this lessened vibration at the beginning of measuring operations which is also continued throughout measuring operations, there is obviated the necessity of providing a dash pot or other damping means in connection with the pointer of the indicating means.

Another feature of importance relates to the provision of feeding means for the work separate from the measuring elements so that the later being freed from the function of feeding the work may be constructed and arranged to respond more sensitively to variations in the thickness of the work without danger of marring the surface of the work or of compressing unduly work even of a soft or yielding quality. In other words, when freed of any work feeding function the measuring elements may be constructed and arranged with a view solely to their efficiency as measuring elements contacting with a surface of the work to be measured.

These and other features of the invention will be described in detail in the specification and pointed out in the appended claims.

In the drawings,

Fig. 1 is a plan view from above of the work feeding and measuring elements, other parts being in section along the line II—II of Fig. 2;

Fig. 2 is a sectional view along the line I—I of Figs. 1 and 3 looking in the direction of the arrows;

Fig. 3 is a front view partly in section of the machine shown in Fig. 2 but on a reduced scale;

Fig. 4 is a detail in side elevation of a group of work feeding and measuring elements showing the relative positions of these elements with respect to the entering end of the work;

Fig. 5 is a similar view of the same elements when all of them have been raised by the work;

Fig. 6 is a similar view of the same group of elements as the rear end portion of the work is passing away from the measuring elements; and Fig. 7 is a diagrammatic representation of the measuring elements disclosed in Fig. 1 showing the path of these elements lengthwise of the skin or other piece of work.

In the illustrated thickness measuring machine there is provided a work supporting table 10 over which a hide, skin or other piece of work is fed into the grip of a feeding mechanism comprising a relatively large bed roll 12 which projects up through a slot in the table 10, the said bed roll 12 being secured for rotation on a shaft 14 suitably supported in journal bearings or boxes 16 adjustably secured in place in frame members 18 by means of set screws 20. For cooperation with the bed roll 12 in feeding operations there is provided a plurality of feeding rolls or wheels 22, each wheel being carried for free rotation in bearings at the free ends of supporting members 24 loosely mounted upon a shaft 26 secured in bearings 28 provided by a frame member 30. It will be understood that the bed roll 12 is the power driven member and that the feeding wheels 22 by contact with the work serve to keep the work pressed upon the peripheral surface of the bed roll to cause feeding of the work and that the wheels themselves are rotated by contact with the work. Preferably, and as shown, these wheels 22 have relatively broad work engaging surfaces so as to insure sufficient traction upon the work to cause perfect feeding thereof without any danger of marring the surface of the work. Through the provision of work feeding means separate from the work measuring elements, the latter may be constructed and adjusted in the machine so as to be suited to the work with a view solely to their work measuring functions.

For performing measuring operations while the work is being fed through the machine there is provided in the illustrated construction a plurality of work measuring or thickness-detecting members each in the form of a rotary member or roll 32 arranged to co-operate with the bed roll 12 which serves as a work support during work-measuring operations. While these rolls do assist in feeding the work, their feeding function is purely incidental. Hence the rolls are made relatively light, with a narrow tread portion to engage the work properly for measuring purposes i. e. with pressure sufficient to follow inequalities in the thickness dimension of the piece of work but without danger of marring the work or of compressing work even of a soft or yielding quality. As shown these rolls 32 are mounted in pairs, each pair upon a link 34 pivoted at its center upon a pivot pin 36 carried at the forward end of an arm 38 of a bell crank lever 40. Preferably, and as shown, each bell crank lever 40 is mounted for rocking movement upon the shaft 26. At its upper end each bell crank lever 40 is pivotally connected to a link 42 in turn pivoted to a downwardly extending arm 44 of a bell crank lever 46 pivotally supported upon a bearing shaft 48 carried by bearings 50 secured to the frame member 30 of the machine. At its forward end the upper arm of each bell crank lever 46 carries a circular member 52 fixedly secured in the end thereof and to the under surface of this circular member there is securely attached one end of a flexible member or chain 54. After passing over a pulley 56 (Fig. 3) this chain 54 has its other end connected to the similar circular member 52 at the end of the next adjacent bell crank lever 46. It will be understood that through this chain 54 there is provided a means for averaging the downward pull on the pulley 56 which is supported in a block 58 connected by means of a flexible member 60 to a lever 62 pivoted at 64 upon a bracket 66 rigidly attached to a frame member 68. At one end the lever 62 is provided with an adjustable weight 70 which serves the purpose of keeping the chains or flexible members 54 and 60 in a taut condition. At its other end the lever 62 is provided with a segment rack 72 arranged to be constantly in mesh with a pinion 74 secured to a spindle 76 mounted rotatably in the bracket 66 and to which is also secured a pointer 78 adapted to indicate thickness measurements as it moves over a scale upon a dial member 80.

Upon inspection of Figs. 2 and 3 it will be readily understood that upward movement of the measuring or thickness-detecting rolls 32 caused by a piece of work introduced between them and the work support or bed roll 12, will result in a downward pull upon both vertical portions of the chain 54, the difference in the pull upon the two vertical portions of the chain being equalized by the pulley 56 so that the average of the downward pull upon the chain 54 is transmitted to the pointer by the connections already described. In this way there is averaged the thickness dimensions of the skin or other piece of leather on opposite sides of an imaginary line extending lengthwise of the skin which line may be, and preferably is, the backbone line of the skin. The illustrated measuring rolls 32 connected to each link 34 average the thickness dimensions at any given instant at two points spaced with respect to each other in a direction longitudinally of the skin or other piece of work. Upon inspection of Figs. 2 and 5 of the drawings it will be clear that each pair of measuring rolls 32 connected to their supporting link 34 exert a lifting effect on the arm 38 of the bell crank 40 in accordance with the average thickness of the work at the two points mentioned, the averaging being accomplished through the link 34.

Preferably and as shown, the rolls 32, carried by one link 34, are located on opposite sides of the link so that they trace different paths over the piece of work, as will be evident from an inspection of Fig. 1 and as indicated diagrammatically in Fig. 7. By this arrangement the four measuring rolls 32 trace four different paths over the work and the measurement upon the dial is the result of an averaging of the thickness dimensions of the work at four points located at two different distances transversely from each side of the backbone line of the skin and at points spaced with respect to each other longitudinally of the skin.

Upon inspection of Fig. 4 of the drawings, it will be observed that only one measuring roll of a connected pair of measuring rolls 32 is lifted at a time during the entrance of the work. Hence, the initial upward movement transmitted to the link 34 upon entrance of the work is only one-half of what the simultaneous upward movement of both rolls would cause, and hence the consequent amount of vibration in the pointer will be relatively very much less so that it is possible to omit the dash pot construction which is so essential a feature of the prior types of thickness measuring machines, the function of the dash pot being to damp the movements of the pointer to help the operator to read the indicated thickness of the work. It will be readily appreciated also that in the illustrated machine vibration of the pointer during measuring operations will be minimized by the arrangement of the measuring rolls 32 in pairs upon centrally pivoted links 24 since there is an initial averaging of the movements of the measuring rolls through their associated links 34 in addition to the averaging through the flexible member 54 and pulley 56.

Preferably, and as shown, stop members 90 are provided extending rearwardly through the upright arm of each bell crank 40 in a position to contact with a portion of the frame bracket 30 to limit the movement of the bell cranks 40 with the idea of preventing the introduction into the machine of pieces of work of such a thickness as would be likely to cause overthrow of parts of the indicating mechanism and thus damage the machine or render it temporarily inoperative. For instance too great a movement of the segment rack 72 might cause it to lose contact with the pinion 74, thus temporarily disabling the machine.

In operating with the machine shown in the drawings, a piece of work, such as a skin, is introduced with the median longitudinal line (the backbone line of a skin) extending in a direction fore and aft of the machine and located approximately midway between the front two rolls 32. In the measuring operation the measuring rolls 32 will trace two paths on each side of the said median line and about equally spaced therefrom so that, when all of the measuring rolls are operating, a reading may be taken from the dial and pointer of the indicating means which will give an average of the four points of contact of the measuring rolls at any given instant and thus secure a fair average of the thickness dimensions of the skin sufficient for all practical purposes.

Having thus described my invention, what I claim as new and desire to secure by Letters Patent of the United States is:—

1. In a measuring machine, a support for a piece of work to be measured, means for feeding the work, a plurality of measuring elements spaced from each other in directions from front to rear and from side to side of the work support and adapted to contact with the work during feeding thereof to measure the thickness dimensions of the work at a plurality of points simultaneously, indicating means, and connections between the indicating means and the measuring elements comprising means for averaging the thickness dimensions obtained by the plurality of measuring elements whereby an average dimension for all of the measuring elements is indicated by the indicating means.

2. In a measuring machine, a support for a piece of work to be measured, means for feeding the piece of work during measuring operations, a plurality of measuring elements one behind another and adapted to contact with the work during feeding thereof at a plurality of points in lines extending in the direction of feed of the work on the support for detecting thickness dimensions of the work, indicating means, and connections between the indicating means and the measuring elements comprising means for averaging the thickness dimensions obtained by the plurality of measuring elements whereby an average dimension for all of the measuring elements is indicated by the indicating means.

3. In a machine for measuring hides, skins, leather, and other similar pieces of work, a work support for a piece of work to be measured, a plurality of measuring rolls arranged to trace each a separate and distinct path on the work during relative movement between the rolls and the piece of work, the rolls being further arranged to contact with the work at a plurality of points spaced from each other in directions from front to rear and from side to side of the work support to measure thickness dimensions thereof during relative movement of the rolls with respect to the work support, indicating means, and connections between the measuring rolls and indicating means comprising means for averaging the thickness dimensions obtained by the measuring rolls whereby an average thickness dimension may be indicated by the indicating means.

4. In a machine for measuring hides, skins, leather, and other similar pieces of work, a support for a piece of work to be measured, a plurality of pairs of measuring rolls, means comprising a link for pivotally supporting each pair of measuring rolls with one roll behind the other in a direction from front to rear of the machine and in the direction of the feed of the work to measure thickness dimensions thereof during relative movement of the rolls with respect to the work support, a bell-crank lever for pivotally supporting each roll-carrying link, indicating means, and connections between the bell-crank levers of all the pairs of measuring rolls and the indicating means comprising means for averaging the thickness dimensions obtained by the pairs of measuring rolls whereby an average thickness dimension for all of the measuring rolls may be indicated by the indicating means.

5. In a machine for measuring hides, skins, leather, and other similar pieces of work, a support for a piece of work to be measured, a plurality of sets of measuring rolls for measuring the piece of work during relative movement between the work and the rolls, a connecting member for the rolls of each set for holding them spaced from each other, means for pivotally mounting the connecting member of each set of rolls between its ends to operate as a lever responsive to the measuring movement of the rolls connected thereto, the rolls of each set being mounted on opposite sides of their connecting member whereby they take measurements along separate and distinct paths on the work during said relative movement of the rolls and the piece of work, indicating means, and connections between the indicating means and the connecting members of all the sets of measuring rolls.

6. In a machine for measuring hides, skins, leather, and other similar pieces of work, a support for a piece of work to be measured, a plurality of sets of measuring rolls for contacting with the work on the support, a plurality of pivotally mounted link members extending in a direction from front to rear of the machine, each link member supporting a measuring roll at each of its ends and upon opposite sides of said link member, the latter connecting the measuring rolls of each set so that the thickness dimensions measured by the rolls of the set may be averaged before being transmitted as an indication of the thickness dimension of the work, indicating means, and connections between the indicating means and the link members of all the sets of measuring rolls.

7. In a machine for measuring hides, skins, leather, and other similar pieces of work, a support for a piece of work to be measured, a plurality of measuring rolls arranged in sets, each set comprising two measuring rolls and a link for connecting the rolls, a plurality of bell-crank levers each connected to the link of one set of rolls, indicating means, and connections between the bell crank levers and indicating means comprising means for averaging the thickness dimensions obtained by the sets of measuring rolls whereby an average dimension for all of the measuring rolls is indicated by the indicating means.

8. In a machine for measuring hides, skins, leather, and other similar pieces of work, a support for a piece of work to be measured, a plurality of measuring rolls arranged in sets, each set comprising two measuring rolls and a link for connecting the rolls along a line extending from front to rear of the machine, a plurality of bell-crank levers each connected to the link of one set of rolls, indicating means, and connections between the bell crank levers and indicating means comprising means for averaging the thickness dimensions obtained by the sets of measuring rolls whereby an average dimension for all of the measuring rolls is indicated by the indicating means.

9. In a machine for measuring hides, skins, leather, and other similar pieces of work, a bed roll, a member arranged to cooperate directly with the bed roll to feed the work during measuring operations, a plurality of rotary work-contacting members spaced from each other in directions both transverse and longitudinal of the bed roll for detecting thickness dimensions of a piece of work during movement thereof over the bed roll, indicating means, and connections between the thickness detecting members and the indicating means.

10. In a machine for measuring hides, skins, leather, and other similar piece of work, a bed roll, a member arranged to co-operate directly with the bed roll in feeding a piece of work, a plurality of rotary work-contacting members spaced from each other in directions both transverse and longitudinal of the bed roll for detecting thickness dimensions of the piece of work during feeding thereof, means for mounting the thickness detecting members in pairs arranged to measure the work at a plurality of points in two separate lines traced by the detecting members on the work during movement thereof, indicating means, and connections between the thickness detecting members and the indicating means.

11. In a machine for measuring hides, skins, leather, and other similar pieces of work, a bed roll for supporting a piece of work to be measured, a plurality of measuring rolls spaced from each other in directions both transverse and longitudinal of the bed roll for contacting with the piece of work to measure the same along a plurality of parallel paths on each side of the median longitudinal line of the piece of work, indicating means, and connections between the plurality of measuring rolls and the indicating means.

12. In a machine for measuring hides, skins, leather, and other similar pieces of work, a work support for a piece of work to be measured, a plurality of members arranged to co-operate directly with the work support in feeding the work during measuring operations, a plurality of measuring rolls spaced from each other in directions both transverse and longitudinal of the work support to measure the piece of work along a plurality of parallel paths on each side of the median longitudinal line of the piece of work, said measuring rolls being separate and distinct from the feeding members, indicating means, and connections between the plurality of measuring rolls and the indicating means.

13. In a machine for measuring hides. skins, leather and other similar pieces of work, a support for a piece of work to be measured, a plurality of rolls for co-operation with the support in feeding the piece of work over the support during measuring operations, a plurality of measuring rolls arranged in alternation with the feeding rolls to measure the piece of work along a plurality of parallel paths on each side of the median longitudinal line of the piece of work, and an indicating means connected to the measuring rolls and comprising means for averaging the thickness dimensions obtained by the measuring rolls whereby an average thickness dimension for all of the measuring rolls is indicated by the indicating means.

14. In a machine for measuring hides, skins, leather, and other similar pieces of work, a support for a piece of work to be measured, means for feeding the piece of work during measuring operations, a plurality of measuring elements spaced from each other in directions from front to rear and from side to side of the work support, the measuring elements being laterally offset with respect to each other in the direction of feed of the work, so that during movement of the work the measuring elements may trace a plurality of separate and distinct paths on each side of the median longitudinal line of the piece of work, and an indicating means connected to the measuring elements and comprising means for averaging the thickness dimensions obtained by the measuring elements whereby an average thickness dimension for all of the measuring elements is indicated by the indicating means.

15. In a machine for measuring hides, skins, leather and other similar pieces of work, a support for a piece of work to be measured, means for feeding the work, a plurality of measuring elements spaced from each other in directions from front to rear and from side to side of the work support and adapted to contact with the work during feeding thereof to measure thickness dimensions of the work at a plurality of points simultaneously, indicating means comprising a dial and a pointer movable over the dial, connections between the measuring elements and the pointer for moving the latter in accordance with the movements of the measuring elements, and means for preventing excessive upward movement of the measuring elements such as to cause disconnection between the measuring elements and the pointer of the indicating means.

16. In a machine for measuring hides, skins, leather and other similar pieces of work, a support for a piece of work to be measured, means for feeding the work, a plurality of measuring elements spaced from each other in directions from front to rear and from side to side of the work support and adapted to contact with the work during feeding thereof to measure thickness dimensions of the work at a plurality of points simultaneously, indicating means comprising a dial and a pointer movable over the dial, connections between the measuring elements and the pointer comprising a gear and a segment rack in mesh for moving the pointer in accordance with the movements of the measuring elements, and means for preventing excessive upward movement of the measuring elements such as might cause disconnection between the rack and the gear thus disabling the indicating means.

In testimony whereof I have signed my name to this specification.

GEORGE E. McLAUGHLIN.